United States Patent
Tinaphong et al.

(10) Patent No.: US 9,312,599 B2
(45) Date of Patent: Apr. 12, 2016

(54) LOW PROFILE OMNI-DIRECTIONAL PLANAR ANTENNA WITH WIFI VIDEO STREAMING CAPABILITY THROUGH BROADBAND NETWORK

(71) Applicant: VOXX International Corporation, Hauppauge, NY (US)

(72) Inventors: Prapan Paul Tinaphong, Carmel, IN (US); Chung Hua Hung, Kaohsiung Hsien (TW); James K. Rinehart, Indianapolis, IN (US); S. Ian Geise, Carmel, IN (US)

(73) Assignee: VOXX International Corporation, Hauppauge, NY (US)

( * ) Notice: Subject to any disclaimer, the term of this patent is extended or adjusted under 35 U.S.C. 154(b) by 182 days.

(21) Appl. No.: 14/147,725

(22) Filed: Jan. 6, 2014

(65) Prior Publication Data

US 2014/0191909 A1   Jul. 10, 2014

Related U.S. Application Data

(60) Provisional application No. 61/750,144, filed on Jan. 8, 2013.

(51) Int. Cl.
   *H01Q 1/24* (2006.01)
   *H01Q 1/22* (2006.01)
   *H04N 7/06* (2006.01)

(52) U.S. Cl.
   CPC .......... *H01Q 1/2291* (2013.01); *H01Q 1/2275* (2013.01); *H04N 7/06* (2013.01)

(58) Field of Classification Search
   CPC ...... H01Q 1/2275; H01Q 1/2291; H04N 7/06
   USPC ........................................ 343/702; 348/554
   See application file for complete search history.

(56) References Cited

U.S. PATENT DOCUMENTS

| | | | |
|---|---|---|---|
| 5,448,255 A | 9/1995 | Hulett et al. | 343/840 |
| 8,269,672 B2 | 9/2012 | Tinaphong et al. | 343/700 MS |
| 2003/0040270 A1 | 2/2003 | Green, Sr. et al. | 455/3.02 |
| 2008/0165284 A1 | 7/2008 | Yang et al. | 348/554 |
| 2008/0320545 A1 | 12/2008 | Schwartz | 725/135 |
| 2011/0047583 A1 | 2/2011 | Howard et al. | 725/109 |
| 2012/0044426 A1* | 2/2012 | Jeffery et al. | 348/726 |
| 2012/0246350 A1 | 9/2012 | Lee | 710/16 |

OTHER PUBLICATIONS

The International Search Report dated May 7, 2014 and the Written Opinion of the International Searching Authority dated Apr. 16, 2014, issued by the International Bureau of WIPO for Applicant's corresponding PCT Application No. PCT/US14/10289, filed on Jan. 6, 2014.

* cited by examiner

Primary Examiner — Hoang V Nguyen
(74) Attorney, Agent, or Firm — Gerald T. Bodner

(57) ABSTRACT

An antenna device includes a housing defining an interior cavity, and an RF antenna situated within the housing. The RF antenna receives high definition television signals broadcast over the air. An MHL connector is mounted on the housing. An external audio or video streaming signal device is coupleable to the MHL connector. An MHL to HDMI converter circuit situated within the interior cavity of the housing receives signals from the external audio or video streaming signal device and processes these signals into an HDMI signal format. The HDMI signals are provided on an HDMI output connector mounted on the housing. RF signals from the RF antenna are provided to an RF coaxial cable connector also mounted on the housing.

18 Claims, 8 Drawing Sheets

LOW PROFILE OMNI-DIRECTIONAL PLANAR ANTENNA WITH WIFI VIDEO STREAMING CAPABILITY THROUGH BROADBAND NETWORK

CROSS-REFERENCE TO RELATED APPLICATIONS

This application is related to U.S. Provisional Patent Application Ser. No. 61/750,144, which was filed on Jan. 8, 2013, and is entitled "Low Profile Omni-Directional Planar Antenna With WiFi Video Streaming Capability Through Broadband Network", the disclosure of which is hereby incorporated by reference and on which priority is hereby claimed.

BACKGROUND OF THE INVENTION

1. Field of the Invention

The present invention relates to high definition television antennas, and video and audio data streaming devices.

2. Description of the Prior Art

Nowadays, many consumers watch their movies or listen to music through their video and audio streaming devices, such as a Google Chromecast™ device, a Netgear™ device, Hulu™ supported devices, or the Roku Streaming Stick™ device (also known, and referred to herein, as the Roku™ Stick). Many consumers subscribe to Netflix™, Hulu™ or Roku™ in order to avoid the expensive monthly service charge from the cable TV company, and by doing so they will not be able to receive those local TV news and programs that are normally provided by the cable TV service. Companies such as Roku™, Google™ and other service companies that provide video on demand (VOD) or audio and video on demand (AVOD) services always face the same problem due to lack of capability to provide the local TV signals or programs with their audio and video streaming devices and services.

Roku™ is a company that provides video content streaming through broadband service. A Roku Stick is normally installed on the back side of a television set, as shown in FIG. 1. However, with the Roku Stick installed in this manner, WiFi signals may be attenuated by the television, and reception may be poor.

OBJECTS AND SUMMARY OF THE INVENTION

It is an object of the present invention to provide a low profile, omni-directional planar antenna with WiFi video streaming capability through a broadband network.

It is another object of the present invention to provide an omni-directional, high definition television antenna which is capable of receiving both off-air (non-cable) television signals and WiFi data streaming audio and digital signals in a single unit.

It is yet another object of the present invention to provide a simple way to combine the benefit of the video streaming capability through WiFi signal and capability to receive local off-air (i.e., over-the-air) TV programs into one single device or single piece of electronic unit.

It is still another object of the present invention to provide a high definition television antenna on which a video streaming device may be mounted, which will help improve the WiFi signal reception of the video streaming device.

It is a further object of the present invention to provide a high definition television antenna on which a video streaming device may be mounted, which helps to solve the need to have separate power supplies for the video streaming device, such as the Roku Stick, and for the amplifier circuit for the antenna.

In accordance with one form of the present invention, an omni-directional, high definition television antenna is modified to be capable of having mounted thereon, and being electrically coupled to, a WiFi video or audio streaming device. The antenna may include a USB (universal serial bus), HDMI (high definition multimedia interface) or MHL (mobile high-definition link) interface circuit to couple with the video or audio streaming device, which avoids any signal interference between the WiFi tuner inside the video streaming device (Roku Stick, for example) and the reception elements or amplifier circuitry of the antenna.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1A:
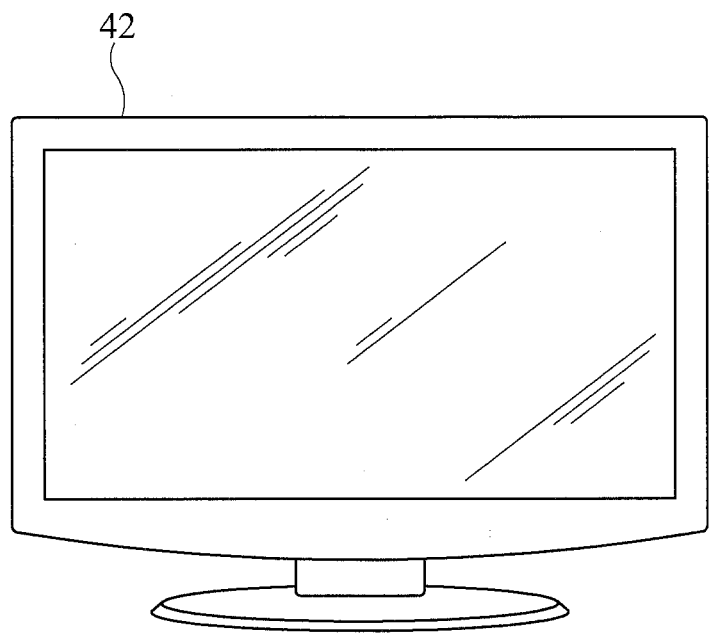
FIG. 1A is a front perspective view of a conventional television set on which a WiFi video or audio streaming component is mounted.

The antenna device 2 of the present invention combines a WiFi data or audio streaming device 4, such as the Roku Stick, with a low profile, high definition antenna 6, such as disclosed in U.S. Pat. No. 8,269,672, which issued on Sep. 18, 2012 to Prapan Paul Tinaphong, et al., and is entitled "Omni-Directional, Multi-Polarity, Low Profile Planar Antenna", the disclosure of which is incorporated herein by reference. The term "WiFi" used herein means wireless fidelity or wireless access to the internet. Furthermore, the term "HDMI" used herein means "high definition multimedia interface", and the term "USB" used herein means "universal serial bus".

The antenna device 2 of the present invention has an antenna housing 8 which may include a port, with a USB, HDMI or MHL connector 10, which is capable of receiving an external, separate WiFi video or audio streaming device 4, such as a Roku Stick. Alternatively, the WiFi video or audio streaming circuit, including a high gain antenna for WiFi signal reception, may be incorporated directly within the housing 8 enclosing the omni-directional, high definition television antenna 4.

Figure 2:
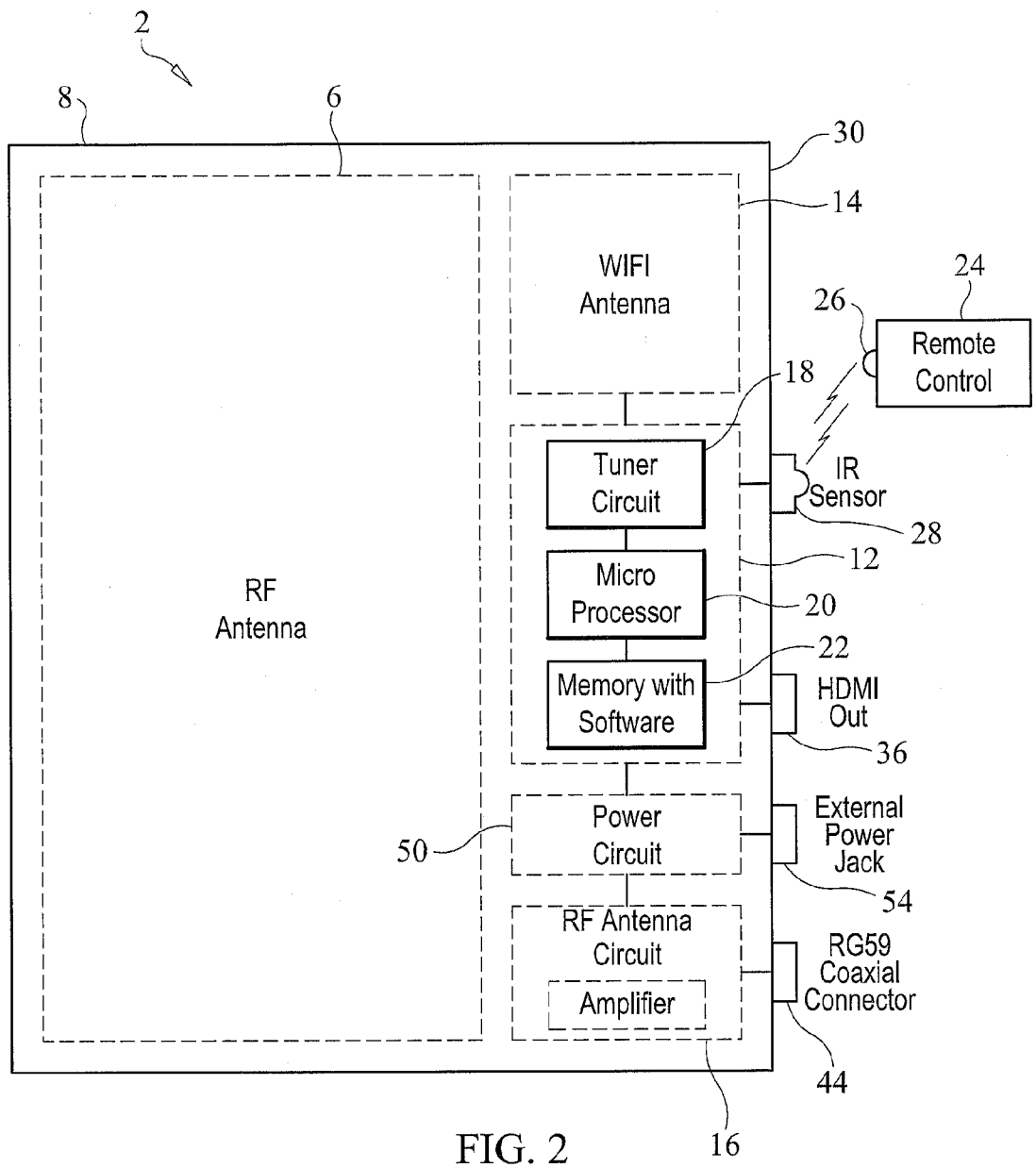
FIG. 2 is a block diagram of a digital, omni-directional antenna formed in accordance with the present invention, and illustrating a WiFi video or audio streaming circuit built therein, and including a high gain WiFi antenna.
Figure 7:
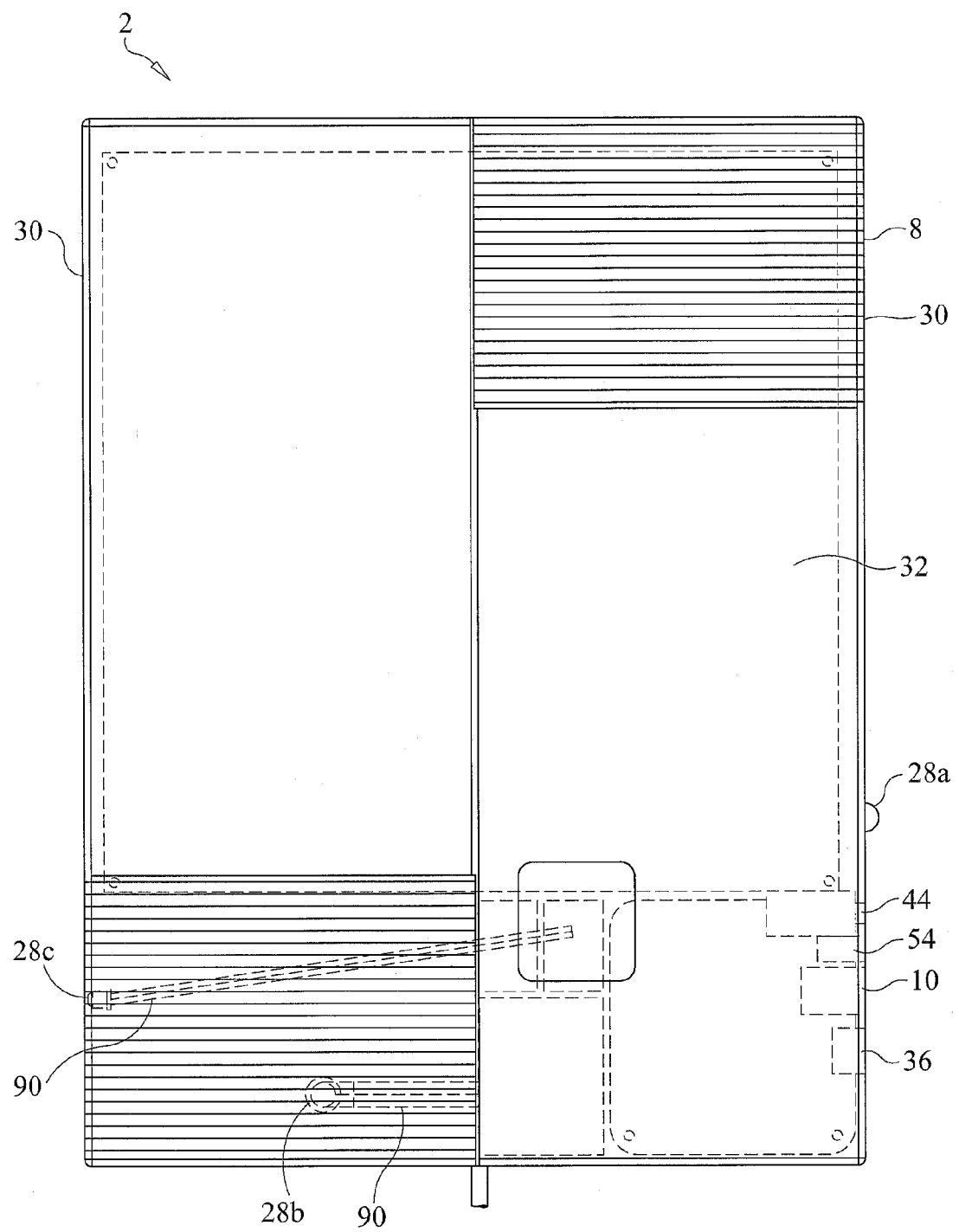
FIG. 7 is a front view of an antenna device formed in accordance with the present invention.
Figure 8:
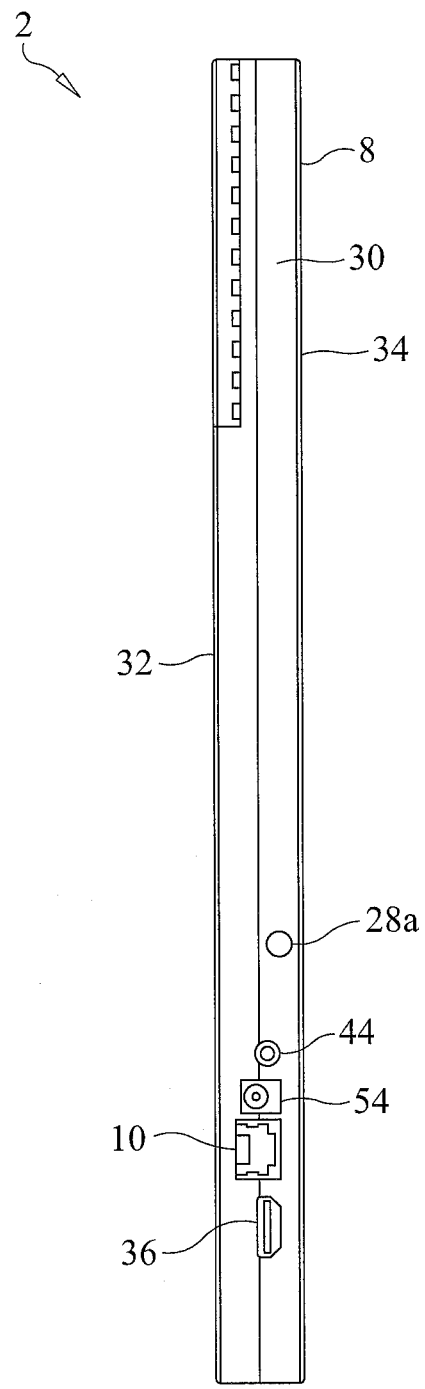
FIG. 8 is a side view of the antenna device shown in FIG. 7.

FIGS. 2, 7 and 8 show an example of a digital, omni-directional antenna device 2 formed in accordance with the present invention, and illustrating a WiFi video or audio streaming circuit 12 built directly therein, and including a high gain WiFi antenna 14 for WiFi signal reception. More specifically, an antenna device 2 formed in accordance with the present invention includes an antenna housing 8 having a generally planar, rectangular shape and defining an interior cavity. Situated within the interior cavity is an RF (radio frequency) planar, omni-directional antenna 6 for receiving high definition television signals that are broadcast over the air, such as disclosed in the aforementioned U.S. Pat. No. 8,269,672 to Tinaphong, et al., associated circuitry for the RF antenna 6 which is electrically connected thereto, such as a pre-amplifier circuit 16, and circuitry 12 for the reception and processing of transmitted WiFi internet signals.

Even more specifically, the WiFi circuit 12 includes a WiFi antenna 14, and one or more of the following circuits: a WiFi tuner circuit 18, which is electrically coupled to the WiFi antenna 14 and/or other circuits, a microprocessor 20 electrically coupled to the tuner circuit 18, and one or more memory circuits 22, such as a read only memory (ROM) or a random access memory (RAM), having software embedded therein, which is electrically coupled to the microprocessor 20.

Preferably, tuning of the WiFi tuner circuit 18, and operation of the WiFi circuit 12, in general, are controlled by a remote control 24 having an infrared (IR) light emitting diode (LED) 26, which transmits an infrared control signal to an IR sensor 28 mounted on the antenna housing 8. Even more preferably, there are more than one sensor 28 mounted on the antenna housing 8 at various locations thereon to detect the infrared control signals transmitted by the remote control 24. For example, a first IR sensor 28*a* may be mounted on a narrow lateral side wall 30 of the antenna housing 8, a second IR sensor 28*b* may be mounted on the larger front wall 32 of the antenna housing 8, and a third IR sensor 28*c* may be mounted on either another lateral side wall 30 of the housing 8 or the rear wall 34 of the housing 8, to insure that infrared control signals transmitted by the remote control 24 will always be detected by at least one of the IR sensors 28 situated on the antenna housing 8, no matter in what disposition the antenna device 2 is placed by the user (such as a vertical disposition or a horizontal disposition). The one or more IR sensors 28 are electrically coupled to the microprocessor 20 of the WiFi circuit 12, and provide electronic signals thereto which correspond to the infrared signals transmitted by the remote control 24. As can be seen from FIG. 7 of the drawings, the IR sensors 28 may include light pipes or fiber optic cables 90 to provide an optical connection between light sensors on the antenna housing 8 and the WiFi circuit 12 or infrared signal processing circuit (see FIG. 6) within the antenna housing 8 so that control signals transmitted from the light sensors to such circuitry and the electrical RF and WiFi signals will not interfere with one another.

The WiFi circuit 12 of the antenna device 2 provides an HDMI-compatible output signal on an HDMI connector 36 mounted on a wall of the antenna housing 8. An external HDMI cable 38 (see FIG. 3) is coupled to the HDMI connector 36 on the antenna housing 8 and to an HDMI input port 40 on a remote television or monitor 42.

As mentioned previously, there is also circuitry associated with the RF antenna, which may include a pre-amplifier circuit 16. The RF antenna circuit, and in particular, the output of the pre-amplifier circuit 16, is electrically connected to an RG59 coaxial cable connector 44 mounted on a wall of the antenna housing 8. This connector 44 is coupled to the RF input port 46 (see FIG. 3) on a remote television or monitor 42 using an external RG59 coaxial cable 48.

The antenna device 2 of the present invention may include a power circuit 50, which provides power to the WiFi circuit 12 and the RF antenna circuit 16. The power circuit 50 may include one or more voltage regulators (see, for example, regulator 52 in FIG. 6), whose outputs provide a particular voltage to the WiFi circuit 12 and the RF antenna circuit 16 required for the operation thereof. An external power jack 54 is mounted on one of the walls of the antenna housing 8 and is electrically connected to the power circuit 50 within the interior cavity of the antenna housing 8. The power jack 54 may be connected to an AC-to-DC converter module (see, for example, DC power supply 72 in FIG. 4), such as including a step-down transformer, full wave rectifier circuit and filter circuit, which in turn is connected to a conventional household wall outlet providing 120 volts AC power. Alternatively, the power circuit 50 may be situated in a remote device 56 (see FIGS. 4 and 5) which is connected to the RG59 coaxial cable connector 44 on the antenna housing 8. Such an external power circuit 56 will be described in greater detail.

Figure 3:
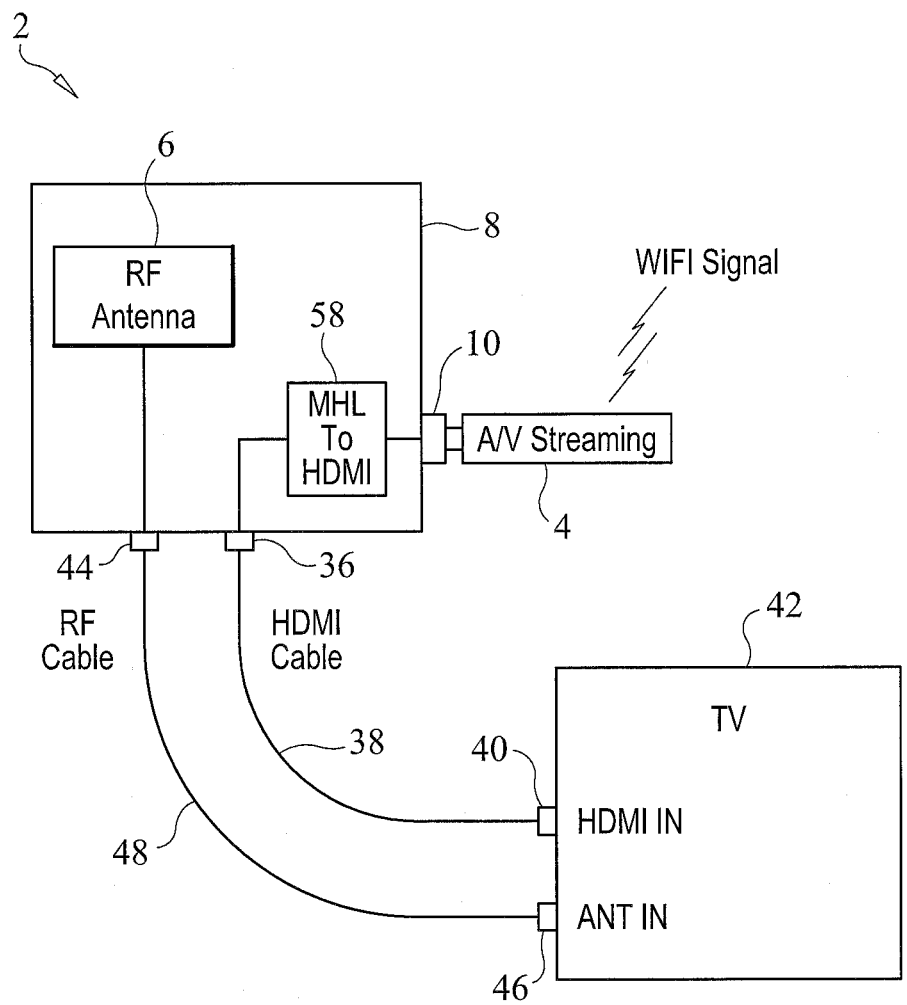
FIG. 3 is a simplified block diagram of the antenna of the present invention and illustrating a WiFi video or audio streaming component (such as a Roku Stick) mounted thereon, and further illustrating the connection of the WiFi-enabled antenna to a television set.

Another form of an antenna device 2 constructed in accordance with the present invention is shown in FIG. 3 of the drawings. As shown in FIG. 3, a Roku Stick (or other WiFi video or audio streaming device 4) is removably mounted on and electrically coupled to the housing 8 enclosing the off-air television signal antenna 6 by way of an MHL, HDMI or USB connector 10. The streamed WiFi signal received by the Roku Stick 4, for example, is provided to the television 42 through an HDMI cable 38, which is connected to the HDMI input 40 on the television 42. The broadcast television signal received by the high definition antenna 6 is provided to the television 42 through an RG59 coaxial cable 48 connected to the "Antenna In" input 46 on the television.

Figure 1B:
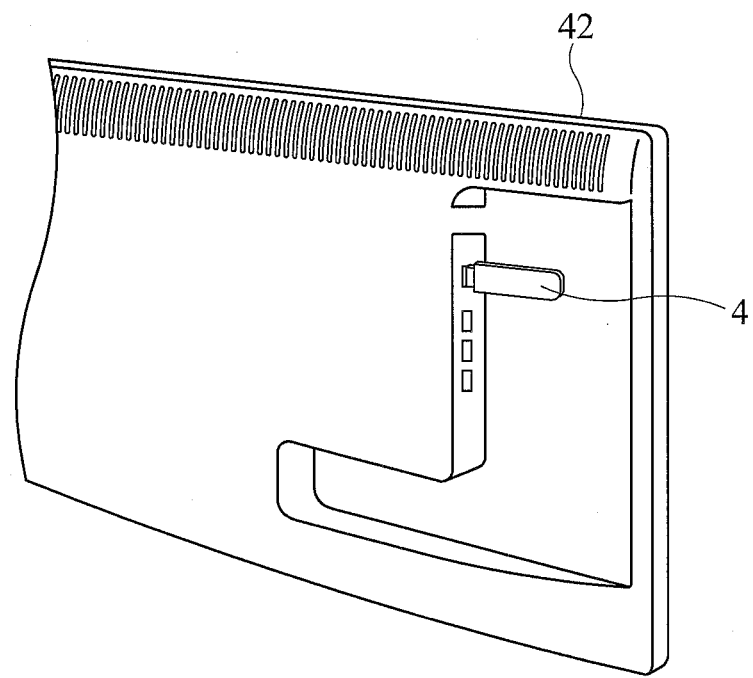
FIG. 1B is a rear perspective view of the conventional television set shown in FIG. 1A, showing the WiFi video or audio component (in this example, a Roku Stick) mounted thereon.

A Roku Stick 4 is normally installed on the rear side of a television set 42, as shown in FIG. 1B. With the Roku Stick 4 installed in this manner, WiFi signals may be attenuated by the television 42, and reception may be poor. However, with the present invention, having the Roku Stick or other WiFi video or audio streaming device 4 or circuit 12 mounted on or incorporated in the antenna housing 8, WiFi signal reception of the Roku Stick or any other video streaming device 4 will be improved, since consumers usually hang their antenna on a wall in a relatively high position in order to receive strong TV signals. Furthermore, since the Roku Stick 4 requires its own power, the present invention helps to solve the need to have a separate power supply for the Roku Stick, since it may share the power supply 50, 56 for the amplifier circuit 16 for the RF antenna 6.

Figure 4:
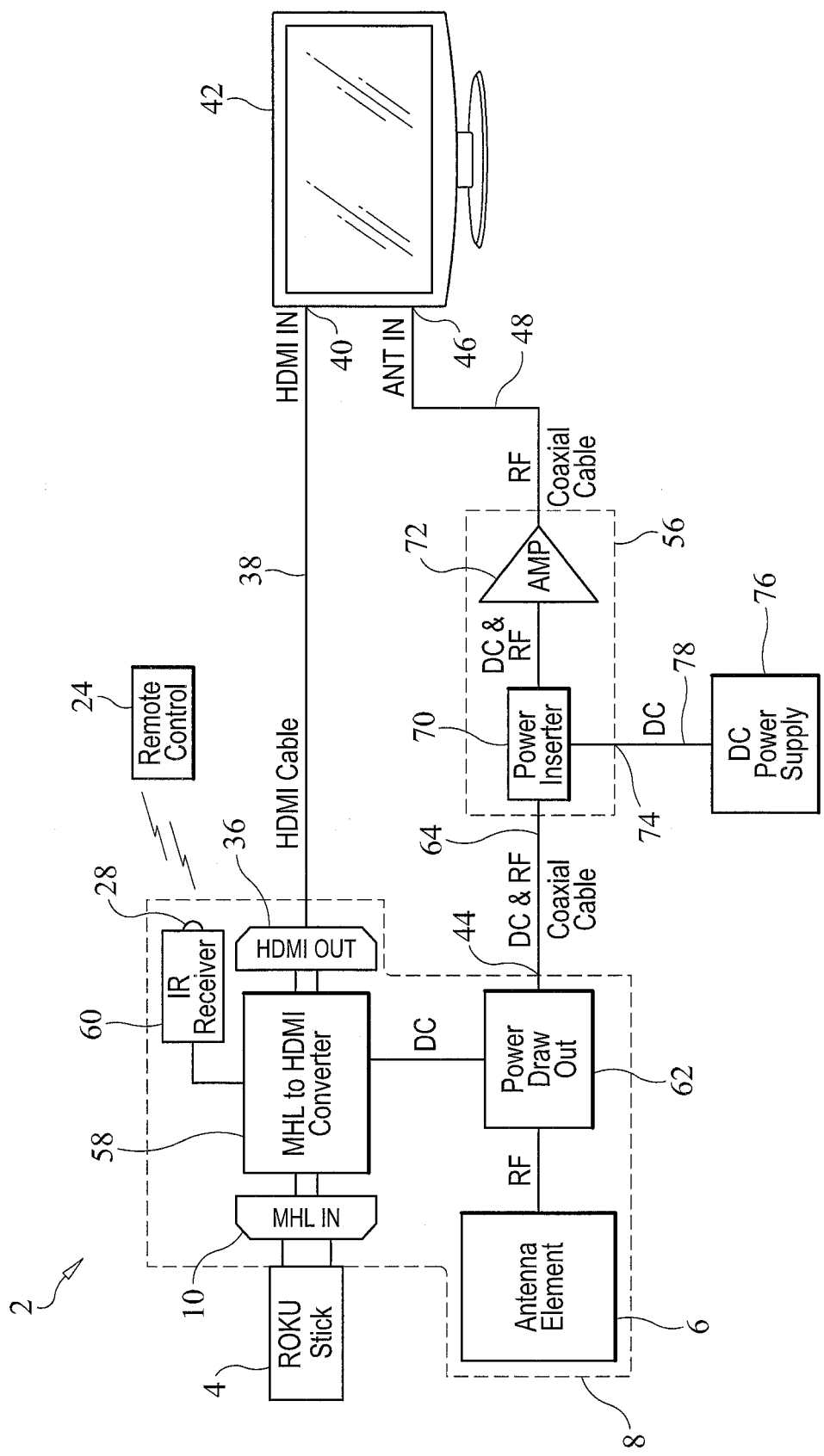
FIG. 4 is a block diagram of another version of the antenna device of the present invention.

FIG. 4 is a more detailed block diagram of an electronic circuit for use in the antenna device 2 illustrated by FIG. 3. The Roku Stick device 4 is plugged into an MHL connector 10 ("MHL IN") mounted on a lateral side wall 30 of the antenna housing 8. The MHL connector 10 is electrically coupled to an MHL to HDMI converter circuit 58 situated within the interior cavity of the antenna housing 8. The circuit 58 converts the MHL-formatted signals to HDMI-formatted signals, and these signals are provided to an HDMI output connector 36 ("HDMI OUT") also mounted on a lateral side wall 30 of the antenna housing 8. The user couples a conventional HDMI cable 38 to the "HDMI OUT" connector 36 on the antenna housing 8 and to the "HDMI IN" input port 40 on a television or monitor 42. An infrared (IR) signal receiver circuit 60, which includes one or more IR sensors 28, mentioned previously, is electrically connected to the MHL to HDMI converter circuit 58, and receives infrared signals transmitted by a remote control 24 by the user. The remote control 24 controls the operation of the MHL to HDMI converter circuit 58 and the tuning of the Roku Stick device 4.

The antenna device 2 also includes an RF antenna element 6, referred to previously herein as the omni-directional, high definition television antenna, which provides an RF signal corresponding to high definition television signals broadcast over the air. The antenna device 2 further includes within the interior cavity of the housing 8 a power drawout circuit 62 which, as will be explained further, draws DC power from a coaxial cable (preferably, an RG59 coaxial cable) 64 connected between the antenna device 2 of the present invention and a separate power supply circuit 56 connected thereto. This DC signal may be, for example, combined with the RF signal on the coaxial cable 64, or may be carried by the center conductor (as positive) and the shield (as negative) of the coaxial cable 64. The DC power extracted by the power drawout circuit 62 is provided to the MHL to HDMI converter circuit 58, the Roku Stick device 4 and any circuitry, such as a pre-amplifier circuit 16, that is associated with the RF antenna element 6.

Figure 5:
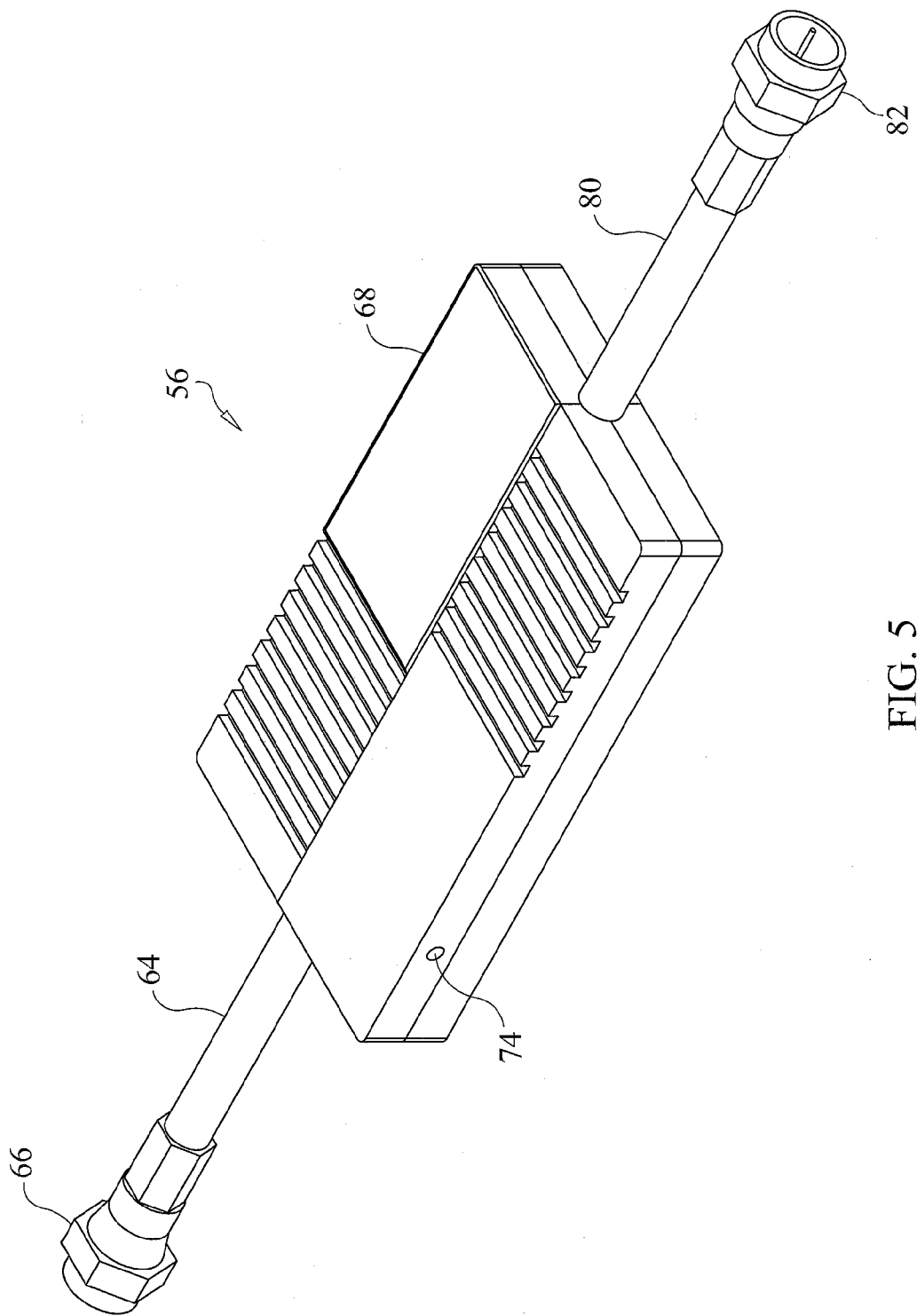
FIG. 5 is a perspective view of a separate power supply device forming part of the present invention and used in conjunction with the antenna device of the present invention.

As mentioned previously, an RF signal connector 44, such as an RG59 coaxial cable connector, is mounted on a side wall 30 of the antenna housing 8. A preferably six foot long RG59 coaxial cable 64 is connected between the RF connector 44 on the antenna housing 8 and an input connector 66, such as a comparable RG59 coaxial cable connector, mounted on the housing 68 of, or connected to, a separate power supply device 56. Such a power supply device 56 is shown in FIG. 5 of the drawings.

More specifically, the power supply device 56 includes a housing 68 defining an interior cavity for mounting therein a power supply circuit. The power supply circuit within the device includes a power inserter circuit 70 (see FIG. 4) and, preferably, a low noise amplifier circuit 72, whose input is connected to the output of the power inserter circuit 70. Alternatively, the amplifier 72 may be incorporated within the housing 8 of the antenna device 2 of the present invention.

On the housing 68 of the power supply device 56 is mounted a jack 74 for receiving a compatible plug from a DC power supply 76. The DC power supply 76, as mentioned previously, may include an AC-to-DC converter circuit having a step-down transformer, a full wave rectifier circuit and a filter circuit. The DC power supply 76 is connectable to a 120 volt AC wall outlet. The output of the DC power supply 76 is connected to the power supply device 56 by a cable 78. Preferably, seven volts DC, at approximately one ampere, is provided to the power inserter circuit 70 within the power supply device 56.

The power inserter circuit 70 adds this DC power signal to the coaxial cable 64 connected between the RF signal connector 44 on the antenna housing 8 and the RF signal input connector 66 on the power supply device 56. As mentioned previously, the power drawout circuit 62 within the antenna housing 8 separates the DC voltage on this cable 64 and provides it to the MHL to HDMI converter circuit 58, the Roku Stick device 4 and any other circuitry 16 within the antenna housing 8 associated with the RF antenna element 6.

The output of the power inserter circuit 70 is provided to the input of the low noise amplifier circuit 72 within the power supply device 56. The low noise amplifier circuit 72 blocks any DC riding on the RF signal from the power inserter circuit 70 and provides an amplified RF signal on the output thereof.

The amplified RF signal is provided to either a coaxial cable 80 connected directly to the output of the low noise amplifier circuit 72, or to an RF signal output connector 82 mounted on or extending from the housing 68 of the power supply device 56. The user couples a coaxial cable 48, such as an RG59 coaxial cable, to the RF output signal connector 82 on the power supply device 56 (or connects the pre-connected RF output signal coaxial cable 80 of the power supply device 56) to the "antenna in" input connector 46 on the television or monitor 42. In this way, the television or monitor 42 will receive not only audio and video signals from the Roku Stick device 4 mounted on the antenna housing 8 and provided to the television or monitor 42 on the HDMI cable 38, but also over-the-air (i.e., off-air) broadcast high definition television signals received by the RF antenna element 6 and provided to the television or monitor 42 on the RF signal coaxial cable 48.

Figure 6:
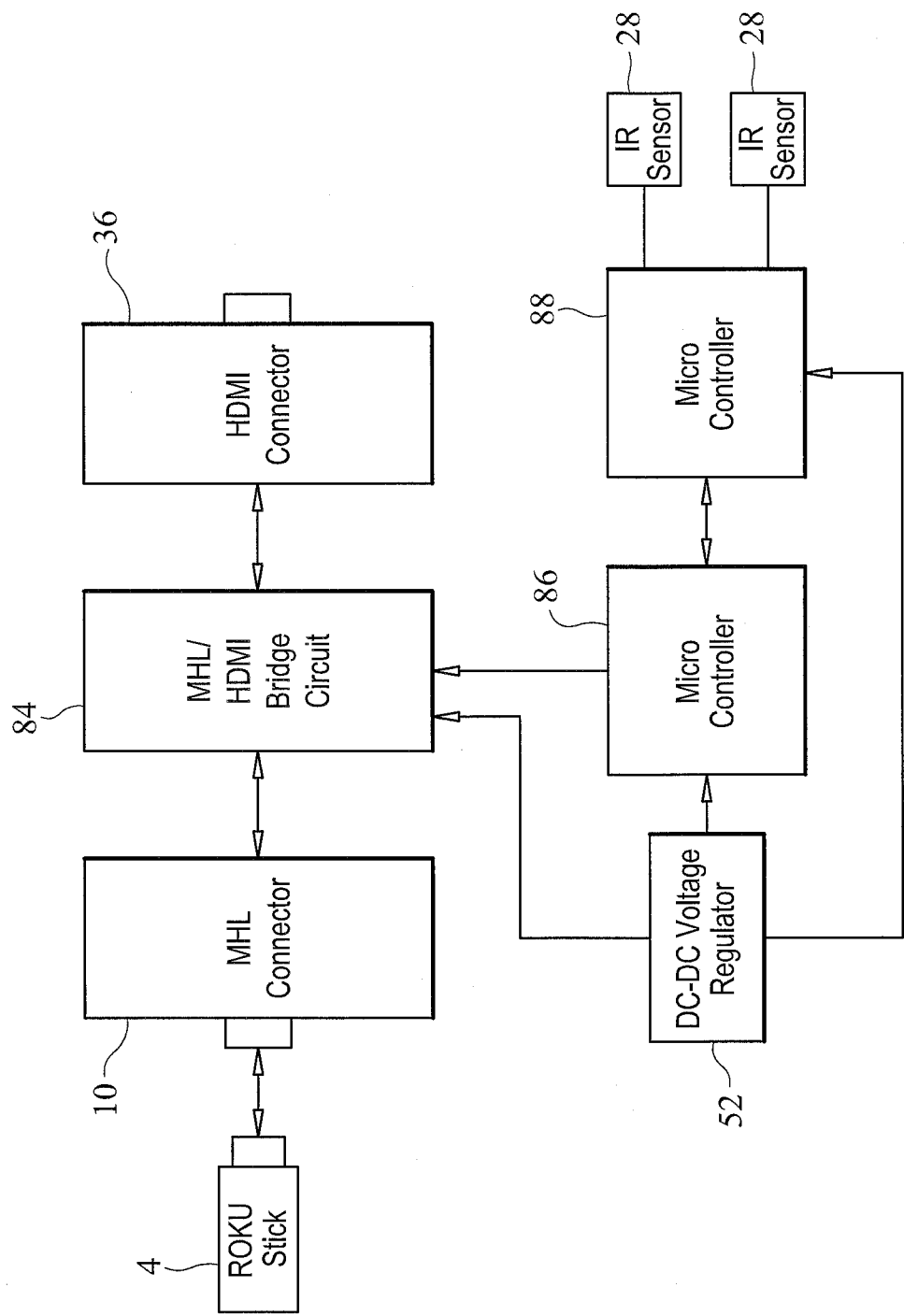
FIG. 6 is a block diagram of an MHL to HDMI converter circuit and IR signal detection and processing circuit forming part of the antenna device of the present invention.

FIG. 6 is a block diagram of the MHL to HDMI converter circuit and IR signal detection and processing circuit preferably used in the antenna device 2 of the present invention. As mentioned previously, the Roku Stick device 4 is plugged into the MHL connector 10 mounted on the housing 8 of the antenna device 2. The MHL connector 10, in turn, is electrically connected to an MHL/HDMI bridge circuit 84 so that signals provided from and to the Roku Stick device 4, through the MHL connector 10, are provided to or generated by the MHL/HDMI bridge circuit 84.

The MHL/HDMI bridge circuit 84 preferably includes Part No. EP94M1 manufactured or distributed by Explore Semiconductor, Inc. of Taipei, Taiwan. The bridge circuit 84 conditions the signals to be in an HDMI format, and the signals are provided to the HDMI connector 36 on the housing 8 of the antenna device 2, which connector 36 is coupled to an HDMI cable 38 connected to the HDMI input port 40 on the television or monitor 42.

The audio, video and other data signals provided to the HDMI connector 36 and provided to, or received from, the Roku Stick device 4 through the MHL connector 10, may be protected against electrostatic discharge voltages and currents using one or more transient voltage suppression (TVS) diode circuits, such as packaged in Part No. TVU1240R1A, manufactured by Inpaq Technology Co., Ltd. of Chunan, Miaoli, Taiwan.

The IR signal detection and processing circuit may include a first microcontroller 86, such as Part No. EPS021M, manufactured by Explore Semiconductor, Inc. This microcontroller interfaces with the MHL/HDMI bridge circuit 84. Another microcontroller 88, which may be an 8-bit microcontroller having an OTP (one time programmable) ROM (read only memory), such as Part No. EM78P173N, manufactured by Elan Microelectronics Corp. of Hsinchu, Taiwan, receives the signals from the one or more IR sensors 28, processes the signals, and provides an output signal to the earlier-described microcontroller 86. The IR sensors 28 may be Part No. IRM3638N3, manufactured by Everlight Electronics Co., Ltd. of Taipei, Taiwan.

The circuit may further include one or more DC-DC voltage regulators 52, which provide regulated DC voltages to the MHL/HDMI bridge circuit 84 and the microcontrollers 86, 88, and any other circuits used in the antenna device 2 of the present invention.

It should be realized that, if the WiFi audio/video streaming device 4 is compatible with an HDMI connector, then the MHL connector and MHL to HDMI converter circuit 58 may be omitted. In lieu of the MHL connector, an HDMI input connector 10 may be used to interface with the HDMI compatible audio/video streaming device 4.

Of course, it should be further realized that, although the various connectors are shown in the drawings as being mounted on the antenna housing 8, they may be affixed to the ends of appropriate lengths of cables or wires extending from the housing and electrically connected to the circuitry within the interior cavity thereof.

As can be seen from the foregoing description, the present invention combines a low profile, omni-directional antenna with a WiFi audio/video streaming component, such as the Roku Stick, and integrates this feature into one simple antenna unit. No one has heretofore ever combined an audio/video streaming feature into the same enclosure with a television signal reception antenna.

Although illustrative embodiments of the present invention have been described herein with reference to the accompanying drawings, it is to be understood that the invention is not limited to those precise embodiments and that various other changes and modifications may be effected herein by one skilled in the art without departing from the scope or spirit of the invention.

What is claimed is:

1. An antenna device, which comprises:
    an antenna housing, the antenna housing defining an interior cavity;
    an RF (radio frequency) antenna which receives high definition television signals broadcast over the air and provides an RF signal corresponding thereto, the RF antenna being disposed within the interior cavity of the antenna housing;
    a WiFi (wireless fidelity) antenna, the WiFi antenna being disposed within the interior cavity of the antenna housing, the WiFi antenna receiving WiFi signals from an internet source and providing an output signal corresponding thereto;
    a WiFi signal processing circuit, the WiFi signal processing circuit being disposed within the interior cavity of the antenna housing, the WiFi signal processing circuit being responsive to the output signal of the WiFi antenna and selectively tuning the WiFi signal to a particular frequency and providing audio or video signals in response thereto, the WiFi signal processing circuit including a WiFi tuner circuit electrically coupled to the WiFi antenna, a microprocessor electrically coupled to the WiFi tuner circuit, and a memory circuit electrically coupled to the microprocessor, the memory circuit including at least one of a random access memory (RAM) and a read only memory (ROM);
    an RF coaxial cable connector, the RF coaxial cable connector being mounted on or extending from the antenna housing, the RF coaxial cable connector providing the RF signal from the RF antenna thereon; and
    an HDMI (high definition multimedia interface) cable connector, the HDMI cable connector being mounted on or extending from the antenna housing, the HDMI cable connector being electrically coupled to the WiFi signal processing circuit and providing the audio or video signals from the WiFi signal processing circuit thereon.

2. An antenna device as defined by claim 1, which further comprises:
    a power circuit, the power circuit being disposed within the interior cavity of the antenna housing and providing power to at least the WiFi signal processing circuit.

3. An antenna device as defined by claim 1, which further comprises:
    an RF signal pre-amplifier circuit, the RF signal pre-amplifier circuit being disposed within the interior cavity of the antenna housing, the RF signal pre-amplifier circuit being responsive to the RF signal provided by the RF antenna and providing an amplified RF signal corresponding thereto, the amplified RF signal being provided to the RF coaxial cable connector.

4. An antenna device as defined by claim 3, which further comprises:
    a power circuit, the power circuit being disposed within the interior cavity of the antenna housing, the power circuit providing power to at least the WiFi signal processing circuit and the RE signal pre-amplifier circuit.

5. An antenna device as defined by claim 1, which further comprises:
    at least one IR (infrared) sensor, the at least one IR sensor being mounted on the antenna housing and being electrically coupled to the WiFi signal processing circuit, the at least one IR sensor sensing an IR signal transmitted by a remote control and generating an output signal in response thereto, the output signal being provided to the WiFi signal processing circuit.

6. An antenna device as defined by claim 1, wherein the antenna housing is generally planar in shape and includes a front wall, a rear wall and opposite first and second lateral walls; and wherein the antenna device further comprises at least a first IR (infrared) sensor, a second IR sensor and a third IR sensor, the first IR sensor being mounted on the front wall of the antenna housing, the second IR sensor being mounted on the first lateral wall of the antenna housing, and the third IR sensor being mounted on one of the second lateral wall and the rear wall of the antenna housing, each of the at least first IR sensor, the second IR sensor and the third IR sensor being electrically coupled to the WiFi signal processing circuit, at least one of the at least first IR sensor, the second IR sensor and the third IR sensor sensing an IR signal transmitted by a remote control and generating an output signal in response thereto, the output signal being provided to the WiFi signal processing circuit.

7. An antenna device, which comprises:
    an antenna housing, the antenna housing defining an interior cavity;
    an RF (radio frequency) antenna disposed within the antenna housing, the RF antenna receiving high definition television signals broadcast over the air and providing an RF signal corresponding thereto;
    a streaming signal input connector mounted on the antenna housing, the streaming signal input connector being capable of supporting and electrically connecting to an external WiFi (wireless fidelity) audio or video signal streaming device directly mounted on the antenna housing in the streaming signal input connector, the external WiFi audio or video streaming device providing on the streaming signal input connector on which it is mounted an audio or video streaming signal;
    an HDMI (high definition multimedia interface) cable connector, the HDMI cable connector being mounted on or extending from the antenna housing, the HDMI cable connector being electrically coupled to the streaming signal input connector and providing thereon the audio or video streaming signal; and
    an RF coaxial cable connector, the RF coaxial cable connector being mounted on or extending from the antenna housing, the RF coaxial cable connector providing the RF signal from the RF antenna thereon.

8. An antenna device as defined by claim 7, wherein the streaming signal input connector is an MHL (mobile high-definition link) connector, wherein the MHL connector is operatively coupled to an external WiFi audio or video signal streaming device having a mating MHL connector thereon, and wherein the antenna device further comprises:
an MHL to HDMI converter circuit, the MHL to HDMI converter circuit being electrically coupled to the MHL connector and to the HDMI cable connector.

9. An antenna device as defined by claim 7, which further comprises:
a power drawout circuit, the power drawout circuit being disposed within the interior cavity of the antenna housing; and
a power inserter circuit, the power inserter circuit being remotely located from the antenna housing, the power inserter circuit being electrically coupled to the power drawout circuit;
wherein the power inserter circuit is electrically connectable to the RF signal coaxial cable connector and provides a DC voltage signal to the RF signal coaxial cable connector; and
wherein the power drawout circuit is responsive to the DC voltage signal from the power inserter circuit and extracts the DC voltage signal from the RF signal coaxial cable connector.

10. An antenna device as defined by claim 9, which further comprises:
a low noise amplifier, the low noise amplifier being located remotely from the antenna housing, the low noise amplifier being electrically coupled to the power inserter circuit and amplifying the RF signal provided on the RF signal coaxial cable connector.

11. An antenna device as defined by claim 7, which further comprises:
an RF signal pre-amplifier circuit, the RF signal pre-amplifier circuit being disposed within the interior cavity of the antenna housing, the RF signal pre-amplifier circuit being responsive to the RF signal provided by the RF antenna and providing an amplified RF signal corresponding thereto, the amplified RF signal being provided to the RF coaxial cable connector.

12. An antenna device as defined by claim 7, which further comprises:
at least one IR (infrared) sensor, the at least IR sensor being mounted on the antenna housing, the at least one IR sensor sensing an IR signal transmitted by a remote control and generating an output signal in response thereto; and
an IR signal processing circuit, the IR signal processing circuit being disposed within the interior cavity of the antenna housing and being responsive to the output signal of the at least one IR sensor and providing a control signal in response thereto, the control signal being provided to the streaming signal input connector and to an external audio or video signal streaming device when the audio or video signal streaming device is coupled to the streaming signal input connector.

13. An antenna device, which comprises:
an antenna housing, the antenna housing defining an interior cavity;
an RF (radio frequency) antenna which receives high definition television signals broadcast over the air and provides an RF signal corresponding thereto, the RF antenna being disposed within the interior cavity of the antenna housing;
a WiFi (wireless fidelity) antenna, the WiFi antenna being mounted on the antenna housing, the WiFi antenna receiving WiFi signals from an internet source and providing an output signal corresponding thereto;
a WiFi signal processing circuit, the WiFi signal processing circuit being disposed within the interior cavity of the antenna housing, the WiFi signal processing circuit being responsive to the output signal of the WiFi antenna and selectively tuning the WiFi signal to a particular frequency and providing audio or video signals in response thereto, the WiFi signal processing circuit including a WiFi tuner circuit electrically coupled to the WiFi antenna, a microprocessor electrically coupled to the WiFi tuner circuit, and a memory circuit electrically coupled to the microprocessor, the memory circuit including at least one of a random access memory (RAM) and a read only memory (ROM); and
an electrical signal connector, the electrical signal connector being mounted on or extending from the antenna housing, the electrical signal connector providing the RF signal from the RF antenna thereon.

14. An antenna device as defined by claim 13, which further comprises:
a power circuit, the power circuit being electrically coupled to and providing power to at least the WiFi signal processing circuit.

15. An antenna device as defined by claim 13, which further comprises:
an RF signal amplifier circuit, the RF signal amplifier circuit being responsive to the RF signal provided by the RF antenna and providing an amplified RF signal corresponding thereto.

16. An antenna device as defined by claim 15, which further comprises:
a power circuit, the power circuit being electrically coupled to and providing power to at least the WiFi signal processing circuit and the RF signal amplifier circuit.

17. An antenna device as defined by claim 13, which further comprises:
at least one IR (infrared) sensor, the at least one IR sensor being mounted on the antenna housing and being electrically coupled to the WiFi signal processing circuit, the at least one IR sensor sensing an IR signal transmitted by a remote control and generating an output signal in response thereto, the output signal being provided to the WiFi signal processing circuit.

18. An antenna device as defined by claim 13, wherein the antenna housing is generally planar in shape and includes a front wall, a rear wall and opposite first and second lateral walls; and wherein the antenna device further comprises at least a first IR (infrared) sensor, a second IR sensor and a third IR sensor, the first IR sensor being mounted on the front wall of the antenna housing, the second IR sensor being mounted on the first lateral wall of the antenna housing, and the third IR sensor being mounted on one of the second lateral wall and the rear wall of the antenna housing, each of the at least first IR sensor, the second IR sensor and the third IR sensor being electrically coupled to the WiFi signal processing circuit, at least one of the at least first IR sensor, the second IR sensor and the third IR sensor sensing an IR signal transmitted by a remote control and generating an output signal in response thereto, the output signal being provided to the WiFi signal processing circuit.

* * * * *